(12) United States Patent
Wang et al.

(10) Patent No.: US 9,475,151 B1
(45) Date of Patent: Oct. 25, 2016

(54) METHOD AND APPARATUS FOR ATTACHING A LASER DIODE AND A SLIDER IN AN ENERGY ASSISTED MAGNETIC RECORDING HEAD

(71) Applicant: Western Digital (Fremont), LLC, Fremont, CA (US)

(72) Inventors: Lei Wang, Fremont, CA (US); Jih-Chiou Hser, San Jose, CA (US)

(73) Assignee: WESTERN DIGITAL (FREMONT), LLC, Fremont, CA (US)

( * ) Notice: Subject to any disclaimer, the term of this patent is extended or adjusted under 35 U.S.C. 154(b) by 419 days.

(21) Appl. No.: 13/664,271

(22) Filed: Oct. 30, 2012

(51) Int. Cl.
B23K 26/00 (2014.01)
B23K 26/18 (2006.01)
B23K 26/06 (2014.01)
B23K 1/005 (2006.01)

(52) U.S. Cl.
CPC ........... *B23K 26/0069* (2013.01); *B23K 1/005* (2013.01); *B23K 26/0639* (2013.01); *B23K 26/18* (2013.01)

(58) Field of Classification Search
CPC .......... B23K 2201/36; B23K 26/0639; B23K 1/005; B23K 1/0056; B23K 26/006; B23K 1/00569
USPC ........................... 219/121.6, 121.63, 121.64; 372/43.01–50.23
See application file for complete search history.

(56) References Cited

U.S. PATENT DOCUMENTS

| | | | |
|---|---|---|---|
| 4,906,812 A * | 3/1990 | Nied | B23K 1/0056 219/121.63 |
| 5,653,381 A * | 8/1997 | Azdasht | 228/254 |
| 5,687,267 A | 11/1997 | Uchida | |
| 5,907,571 A | 5/1999 | Ogino et al. | |
| 6,164,837 A | 12/2000 | Haake et al. | |
| 6,485,198 B1 | 11/2002 | Chang et al. | |
| 6,534,794 B1 | 3/2003 | Nakanishi et al. | |
| 6,577,656 B2 | 6/2003 | Chen et al. | |
| 6,627,096 B2 | 9/2003 | Sherrer et al. | |
| 6,804,276 B2 | 10/2004 | Gen-ei et al. | |

(Continued)

FOREIGN PATENT DOCUMENTS

DE          4200492 A1 *  4/1993  ........... B23K 26/032

OTHER PUBLICATIONS

Translation of DE4200492 (A1); Azdasht, Ghassem, The electrical connection of contact elements—incorporates fibre optic conductor in laser device, leading laser radiation onto connection spot; Apr. 8, 1993; Espacenet; 14 pages.*

*Primary Examiner* — Dana Ross
*Assistant Examiner* — Kuangyue Chen
(74) *Attorney, Agent, or Firm* — Convergent Law Group LLP (57) ABSTRACT

A method and apparatus attach a laser diode on a submount to a slider. The submount and laser diode form a submount assembly. The slider includes an air-bearing surface (ABS) and a transducer. The apparatus includes an optical fiber and a holder. The optical fiber is configured to carry a laser pulse. The holder includes a vacuum channel and an optical fiber aperture therein. A portion of the optical fiber is held in the optical fiber aperture. The vacuum channel is configured to hold the submount assembly by a pressure differential between a pressure developed in the vacuum channel and an external pressure at a remaining portion of the submount assembly. The pressure in the vacuum channel is less than the external pressure. The method holds the submount assembly in the apparatus, aligns the submount assembly to the slider and provides a laser pulse through the fiber.

32 Claims, 7 Drawing Sheets

(56) References Cited

U.S. PATENT DOCUMENTS

| | | |
|---|---|---|
| 6,811,853 B1 | 11/2004 | Sherrer et al. |
| 6,838,689 B1 | 1/2005 | Deng et al. |
| 6,858,871 B2 | 2/2005 | Okada |
| 6,960,485 B2 | 11/2005 | Uemura et al. |
| 7,062,133 B2 | 6/2006 | Azimi et al. |
| 7,196,356 B2 | 3/2007 | Ishii et al. |
| 7,217,955 B2 | 5/2007 | Hamaoka et al. |
| 7,371,017 B1 | 5/2008 | Shi et al. |
| 7,405,093 B2 | 7/2008 | Andrews |
| 7,409,125 B2 | 8/2008 | Azimi et al. |
| 7,449,905 B2 | 11/2008 | Shi et al. |
| 7,502,397 B2 | 3/2009 | Naganuma |
| 7,522,649 B2 | 4/2009 | Ha et al. |
| 7,548,673 B2 | 6/2009 | Azimi et al. |
| 7,608,863 B2 | 10/2009 | Oda et al. |
| 7,613,080 B2 | 11/2009 | Oozeki et al. |
| 7,687,810 B2 | 3/2010 | Mo et al. |
| 7,739,703 B2 | 6/2010 | Arai et al. |
| 7,808,744 B2 | 10/2010 | Burbank et al. |
| 7,843,074 B2 | 11/2010 | Gao et al. |
| 2002/0089913 A1 | 7/2002 | Moriyama et al. |
| 2002/0110335 A1 | 8/2002 | Wagner et al. |
| 2002/0163865 A1 | 11/2002 | Zimmer et al. |
| 2003/0002549 A1 | 1/2003 | Oh |
| 2004/0018008 A1* | 1/2004 | Koren et al. ............ 392/416 |
| 2006/0027542 A1* | 2/2006 | Mahadev et al. ....... 219/121.67 |
| 2007/0015313 A1 | 1/2007 | Kwak et al. |
| 2007/0034159 A1* | 2/2007 | Komino et al. ............ 118/725 |
| 2008/0056073 A1* | 3/2008 | Shimizu ............ G11B 5/314 369/13.02 |
| 2008/0316872 A1 | 12/2008 | Shimizu et al. |
| 2009/0001054 A1* | 1/2009 | Mizuno ............ B23K 1/0056 219/78.13 |
| 2009/0035885 A1 | 2/2009 | Karlicek, Jr. et al. |
| 2009/0207580 A1 | 8/2009 | Oshika et al. |
| 2009/0219728 A1 | 9/2009 | Hata et al. |
| 2010/0109030 A1 | 5/2010 | Krames et al. |
| 2010/0139089 A1* | 6/2010 | Vivet et al. ............ 29/840 |
| 2010/0238581 A1 | 9/2010 | Nakamura et al. |
| 2011/0141862 A1 | 6/2011 | Arai et al. |
| 2011/0228649 A1* | 9/2011 | Shimazawa ............ G11B 5/314 369/13.24 |

\* cited by examiner

METHOD AND APPARATUS FOR ATTACHING A LASER DIODE AND A SLIDER IN AN ENERGY ASSISTED MAGNETIC RECORDING HEAD

BACKGROUND

In fabricating disk drives, such as energy assisted magnetic recording (EAMR) disk drives, it may be necessary to bond components together. For example, in conventional EAMR disk drives, a laser provides energy used to heat the media for magnetic recording. The laser typically takes the form of a laser diode and is attached to a semiconductor submount, such as a Si wafer. The laser diode may be desired to be aligned with a waveguide on the slider and bonded with the slider.

Figure 1:
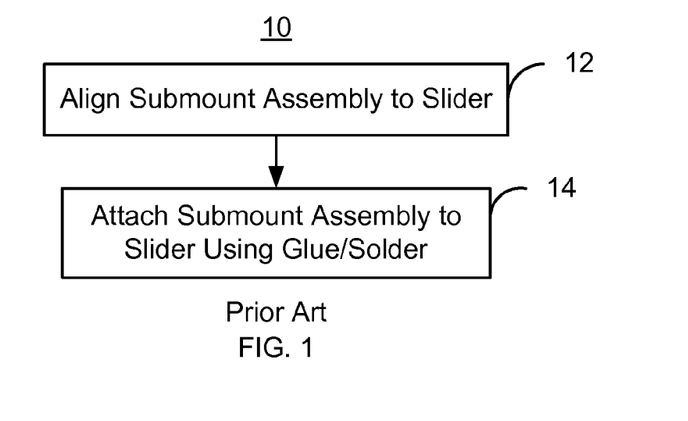
FIG. 1 is a flow chart depicting a conventional method for bonding a conventional laser diode and a conventional slider.
Figure 2:
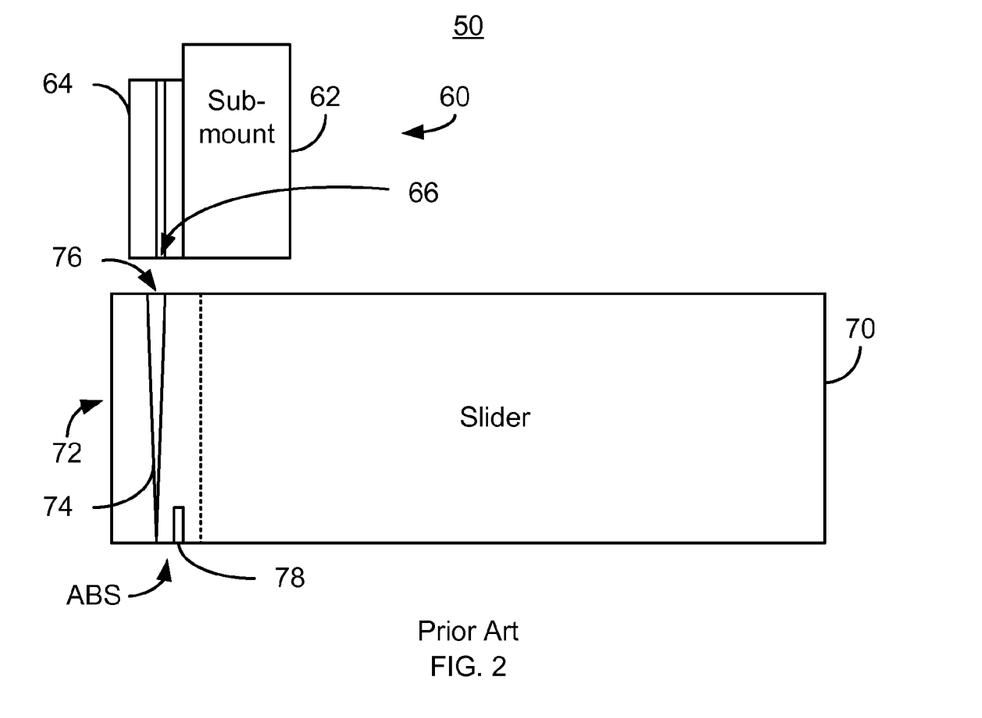
FIG. 2 is a diagram depicting the conventional laser diode and slider during bonding.

FIG. 1 depicts a conventional method 10 for bonding two substrates, such as a conventional laser diode (or substrate on which the laser diode resides) and a slider. FIG. 2 depicts a conventional EAMR head 50 during fabrication using the conventional method 10. FIG. 2 depicts the conventional submount assembly 60 and the slider 70. The conventional submount assembly 60 includes a submount 62 and a laser diode 64. The laser diode includes an emission exit 66 from which the laser 66 provides a pulse during operation of the conventional EAMR head 50. The slider 70 includes a transducer 72. The transducer includes a waveguide 74 having an entrance 76. The transducer 72 may also include a read sensor 78 as well as other components used in writing to a medium (not shown).

The submount assembly 60 is aligned to the slider 70, via step 12. More specifically, the emission exit 66 is aligned with the entrance 76 to the waveguide 74. This is typically done using alignment marks (not shown) on the slider 70 and submount assembly 60. The submount assembly 60 is attached to the slider 70.

Although the conventional method 10 may function, the method 10 may be problematic. Portions of the slider 70 may not be heated to above 200 degrees centigrade. For example, the ABS, particularly the read sensor 78, may be damaged by temperatures in excess of 200° C. If solder is used, many solders, including Sn, melt at 230° C. If the slider 70 is heated sufficiently to reflow such solder, then the transducer 72 may be damaged. The conventional EAMR head 50 may thus not function as desired. In addition, cooling during after heating may affect the alignment between the slider 70 and the submount assembly 60. This may adversely affect yield. In order to avoid such issues, glue or epoxy may be used. However, many epoxies are cured at high temperatures, which may result in the same issues as for solder. If glue is used instead, the joint between the submount assembly 60 and the slider may have poor thermal conductivity. In addition, the joint may be mechanically unstable.

Accordingly, what is needed are improved methods and systems for attaching the submount assembly including the laser diode to the slider of an EAMR disk drive.

BRIEF SUMMARY OF THE INVENTION

A method and apparatus attach a laser diode on a submount to a slider. The submount and laser diode form a submount assembly. The slider includes an air-bearing surface (ABS) and a transducer. The apparatus includes an optical fiber and a holder. The optical fiber is configured to carry a laser pulse. The holder includes a vacuum channel and an optical fiber aperture therein. A portion of the optical fiber is held in the optical fiber aperture. The vacuum channel is configured to hold the submount assembly by a pressure differential between a pressure developed in the vacuum channel and an external pressure at a remaining portion of the submount assembly. The pressure in the vacuum channel is less than the external pressure. The method holds the submount assembly in the apparatus, aligns the submount assembly to the slider and provides a laser pulse through the fiber.

DETAILED DESCRIPTION OF EMBODIMENTS OF THE INVENTION

Figure 3:
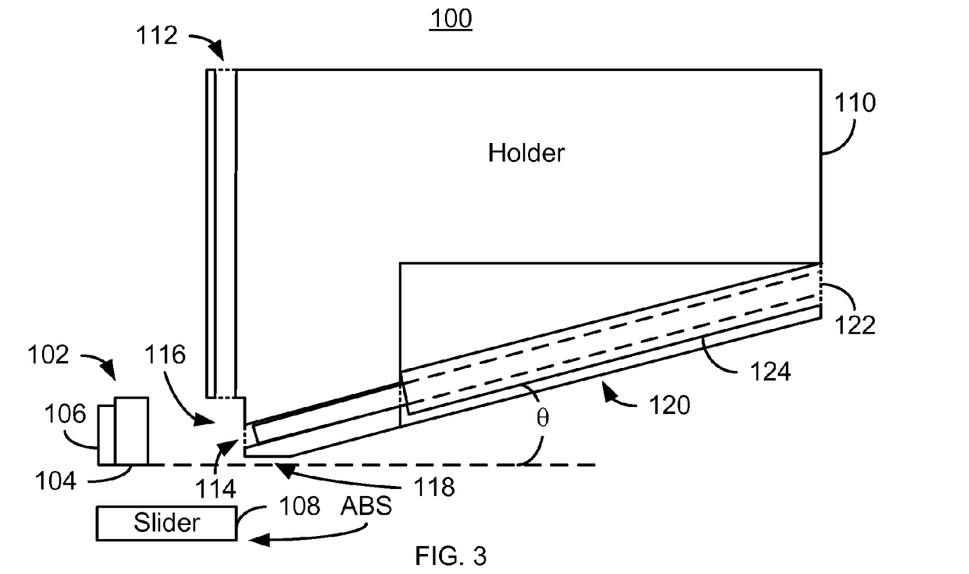
FIGS. 3-4 are diagrams depicting an exemplary embodiment of an apparatus for attaching a laser diode to a slider.
Figure 4:
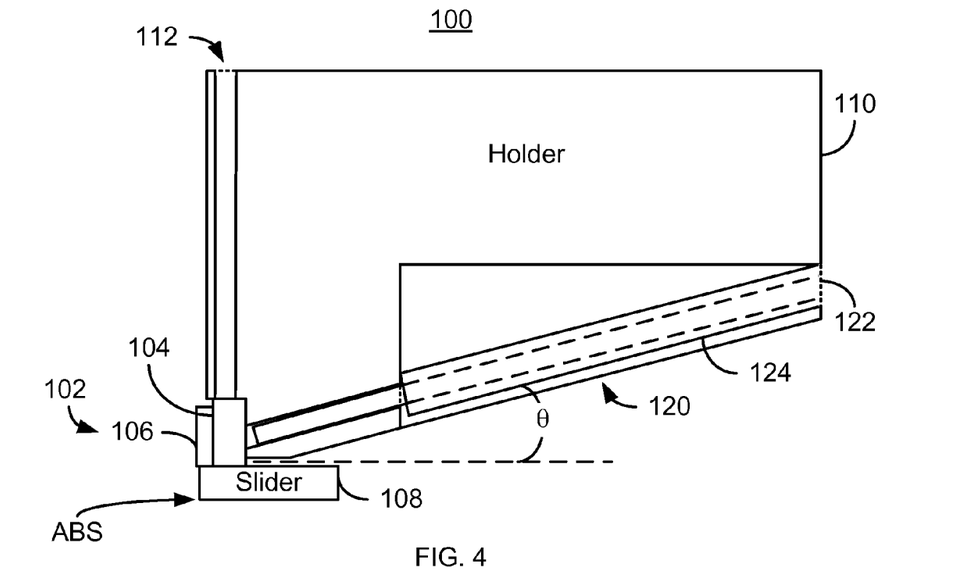

FIGS. 3-4 are diagrams depicting an exemplary embodiment of an apparatus 100 for attaching a laser diode to a slider. For clarity, FIGS. 3-4 are not to scale. The apparatus 100 may also be termed a pickup tool. The apparatus 100 is depicted with a submount assembly 102 and slider 108. The submount assembly 102 includes a submount 104 and a laser 106. In some embodiments, the laser 106 is an edge-emitting laser diode 106. In other embodiments, another type of laser might be used. The submount 102 may be a semiconductor chip, such as a Si chip. Although not specifically depicted in FIGS. 3-4, the slider 108 includes at least one transducer which generally has both read and write heads. The read head typically includes a read sensor at or near the ABS. In FIG. 3, the slider 108 and submount assembly 102 are separate. In FIG. 4, the apparatus 100 has been used to pick up the submount assembly 102, align the submount assembly 102 with the slider 108, and bring the submount assembly 102 close to the slider 108 for bonding.

The apparatus 100 includes a holder 110 and an optical fiber 120. For simplicity, only a portion of the holder 100 and optical fiber 120 are shown. The optical fiber 120 includes a core 122 that may be formed of glass and a sleeve 124, which may be plastic. The portion of the core 122 residing within the sleeve 124 is shown by a dashed line. The optical fiber 120 is configured to carry a laser pulse used in bonding the submount assembly 102 to the slider 108. In some embodiments, the bond is a solder bond, such as a Sn solder bond. In other embodiments, the laser pulse provided through the optical fiber 120 may be used to cure epoxy or otherwise heat treat the medium used to affix submount assembly 102 to the slider 108.

The holder 110 includes a vacuum channel 112 and an optical fiber aperture 114. In the embodiment shown in FIGS. 3-4, the holder 110 also includes a notch 116 and a slider-facing surface. However, in other embodiments, the holder 110 may not include the notch 116 and/or the slider-facing surface 118. For clarity, the notch 116 and slider-facing surface 118 are labeled only in FIG. 3. The open ends of the vacuum channel 112 and optical fiber aperture 114 are denoted by dotted lines.

The optical fiber aperture 114 is used to retain the optical fiber 120 therein. In embodiment the embodiment shown, the optical fiber aperture 114 is aligned such that there is an angle θ between the axis of the optical fiber 120 and the normal to the surface of the submount 104 which will be exposed to the laser pulse during bonding. In some embodiments, the angle θ is at least five degrees and not more than forty-five degrees. However, in other embodiments, other angles may be used. The angle is generally selected such that the laser pulse intersects the submount 104, but not the slider 108 or the holder 110. In some embodiments, the angle may be such that the laser pulse will also intersect the solder. However, in other embodiments, angle may be configured such that the laser pulse intersects other portions of the EAMR disk drive. In some embodiments, the optical fiber aperture 114 is an aperture having sidewalls enclosing a portion of the optical fiber 120. In other embodiments, the optical fiber aperture 114 may be a groove, or depression, in the holder 110 into which the optical fiber 120 fits. Thus, the optical fiber aperture 114 may have sidewalls adjacent to only a portion of the optical fiber 120. In the embodiment shown, the optical fiber 120 is placed within the optical fiber aperture 114 such that the optical fiber 120 terminates within the optical fiber aperture 114. Thus, as can be seen in FIGS. 3 and 4, the end of the optical fiber 120 does not cross the opening for the optical fiber aperture 114 at the notch 116. However, in other embodiments, the optical fiber 120 may terminate at the edge of the optical fiber aperture 120 or outside of the optical fiber aperture 114. In embodiments in which the optical fiber 120 terminates within the optical fiber aperture, it may be desirable to set the distance from the edge of the optical fiber aperture 114 such that the laser pulse (not shown in FIGS. 3-4) does not intersect the holder 110. In some embodiments, the optical fiber 120 terminates at least twenty-five microns and not more than three hundred microns from the surface at which the optical fiber aperture 114 terminates. If, as is shown in FIG. 4, the submount 104 adjoins the surface at which the optical fiber aperture 114 terminates, then the end of the core 122 of the optical fiber 120 may be at least twenty-five microns and not more than three hundred microns from the submount 104.

The vacuum channel 112 is configured to hold the submount assembly 102 using a pressure differential. More specifically, the pressure differential is developed between the pressure in the vacuum channel 112 and an external pressure at a remaining portion of the submount assembly 102. The pressure in the vacuum channel 112 is less than this external pressure. Thus, the vacuum channel 112 holds the submount assembly 102 in place using suction. In some embodiments, the suction is applied only to the submount 104 to which the laser 106 is attached. The vacuum channel 112 may be an enclosed aperture through a portion of the holder 110. A vacuum may be applied to one end of the vacuum channel 112 that is opposite to the surface at which the submount assembly 102 is desired to be held. In some embodiments, at least the portion of the holder 110 adjoining the vacuum channel 112 in the region of the submount assembly is be configured such that sufficient suction can be developed to pick up and hold the submount assembly 102. For example, in some embodiments, the region around the part of the vacuum channel 112 at the notch may be formed of a flexible material.

The holder 110 also includes a notch 116 and a slider-facing surface 118. The notch 116 is configured to fit at least a portion of the submount 104. In the embodiment shown, the height of the notch 116 is less than that of the submount 104. However, in other embodiments, the height of the notch 116 may be greater than the submount 104. In such embodiments, the submount assembly 102 fits entirely within the notch 116. Thus, risk of accidentally crashing the submount 104 into the slider 108 and damaging the slider 108, submount 104, or laser 102 may be reduced. In the embodiment shown, the notch 116 includes a first surface and a second surface for the vacuum channel 112 and the optical aperture 114, respectively. However, in another embodiment, the notch 116 may have another number of surfaces. In addition, the first and second surfaces of the notch 116 are shown as substantially perpendicular. In other embodiments, the surfaces may be at a different angle. The vacuum channel 112 and the optical fiber aperture 114 may also terminate on the same surface. In other embodiments, the notch 116 might be omitted.

The slider-facing surface 118 is generally desired to be parallel to the normal to the laser-facing surface of the submount 104. Stated differently, the slider-facing surface 118 may be parallel to the top surface of the slider 108 to which the submount assembly 102 is to be bonded.

In operation, the apparatus 110 is placed in proximity to the submount assembly 102. In some embodiments, the vertical surface of the notch 116 is placed adjacent to the laser-pulse facing surface of the submount 104 and the horizontal surface of the notch 116 is placed closer to or adjoining the top surface of the submount 104. A low pressure is developed in the vacuum channel 112 and the submount assembly 102 picked up by the apparatus 100. The submount assembly 102 is aligned and placed proximate to the slider 108, as shown in FIG. 4. A laser pulse may then be provided through the optical fiber 120. The laser pulse may be coupled to the submount 102 via free space. Thus, as is seen in FIGS. 3 and 4, no lens may be used to focus the laser pulse on the desired region of the EAMR disk drive. In some embodiments, the laser pulse is coupled only to the submount 102. In other embodiments, the laser pulse may also intersect the mechanism, such as solder or epoxy, used to affix the submount assembly 102 to the slider 108. In some embodiments, the laser pulse may intersect a portion of the slider 108. However, this is generally not desired. The submount 104 may be a Si substrate that is approximately two hundred micrometers thick. In some embodiments, the laser pulse used has a wavelength on the order of nine hundred to one thousand nanometers. The submount 104 may thus absorb the energy of the laser pulse and be heated. This submount 102 and solder are heated sufficiently to melt the solder. In embodiments in which Sn solder is used, the solder may be heated to 230° C. or above. The solder may thus reflow and form a joint/bond between the slider 108 and submount assembly 102. However, the portion of the slider 108 near the ABS may be at a reduced temperature. For example, the region of the slider 108 near the ABS may not be heated above 200° C. Thus, portions of the slider 108, such as the read sensor in a read transducer, may not be heated above 200° C.

Using the apparatus, the submount assembly 102 may be bonded to the slider 108. More specifically, a solder, such as Sn solder, having a higher melting point may be used to affix the submount assembly 102 to the slider 108. This may be accomplished without heating portions of the slider 108 to temperatures which would damage these portions. For example, the read sensor (not shown) near the ABS may not be heated above 200° C. Thus, the submount assembly 102 and slider 108 may be bonded without the magnetic tunneling junction or other read sensor being damaged. Further, the bond between the slider 108 and submount assembly 102 may have improved strength. Because solder heated to higher temperatures may be used, the solder joint (not shown) between the slider 108 and submount assembly 102 may have at least two to three times the strength of a solder bond made using the conventional method 10. Thus, the apparatus 100 may allow for improved yield and improved performance for the EAMR disk drive being fabricated. Although described in the context of solder, the apparatus 100 may also be used to cure epoxy. Thus, the apparatus may be extended to other methods for adjoining the submount assembly 102 to the slider 108.

Figure 5:
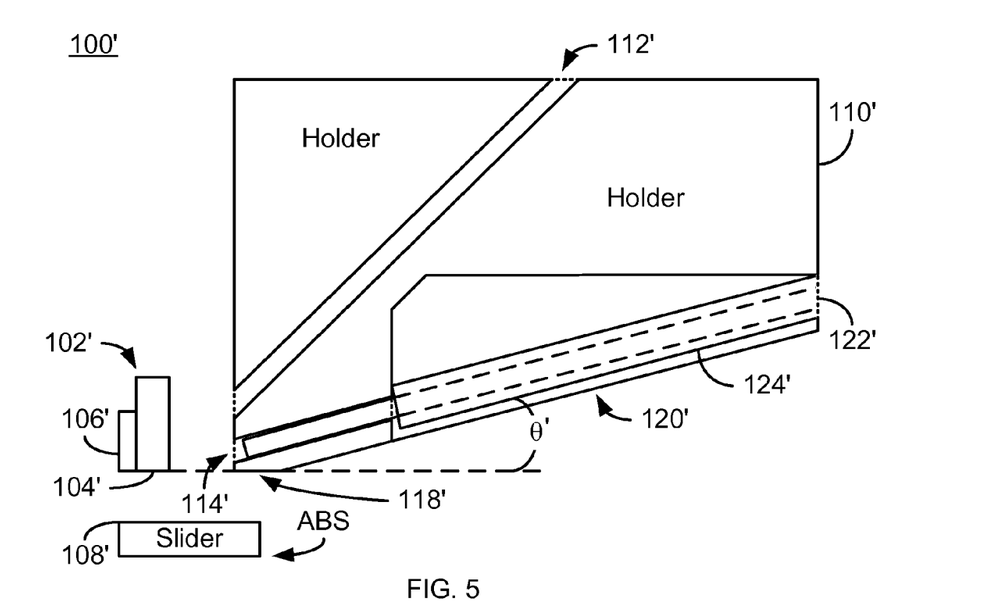
FIG. 5 is a diagram depicting another exemplary embodiment of an apparatus for attaching a laser diode to a slider.

FIG. 5 is a diagram depicting another exemplary embodiment of an apparatus 100' for attaching a laser diode to a slider. For clarity, FIG. 5 is not to scale. The apparatus 100' is analogous to the apparatus 100 depicted in FIGS. 3-4. Thus, the apparatus 100' includes components having analogous structure and function to the components of the apparatus 100. The apparatus 100' is also depicted with a submount assembly 102' and slider 108' analogous to the submount assembly 102 and slider 108, respectively. The submount assembly 102' thus includes a submount 104' and a laser 106' analogous to the submount 104 and laser 106. The apparatus 100' includes a holder 110' and an optical fiber 120' analogous to the holder 100 and optical fiber 120, respectively. For simplicity, only a portion of the holder 100' and optical fiber 120' are shown. The optical fiber 120' includes a core 122' and a sleeve 124' analogous to the core 122 and sleeve 124, respectively. The holder 110 includes a vacuum channel 112', an optical fiber aperture 114', and a slider facing surface 118' analogous to the vacuum channel 112, the optical fiber apertures 114, and the slider facing surface 118, respectively. Although not shown, in other embodiments, the holder 110' may also include a notch. In the embodiment shown, the optical fiber aperture 114' is at an angle of θ' from the normal to the laser pulse facing surface of the submount 104. The angle θ' is analogous to the angle θ. In addition, the apparatus 100' is depicted as having the vacuum channel 112' and the optical fiber aperture 114' as terminating at the same surface of the holder 110'. Although not depicted, the holder 110' may also include a notch analogous to the notch 116.

The apparatus 100' may share the benefits of the apparatus 100. More specifically, the apparatus 100' may be used to bond the slider 108' with the submount assembly 102'. A solder or other bond between the submount assembly 102' and the slider having improved strength may be provided without damaging portions of the slider 108' near the ABS. Thus, yield for fabricating the EAMR head may be improved.

Figure 6:
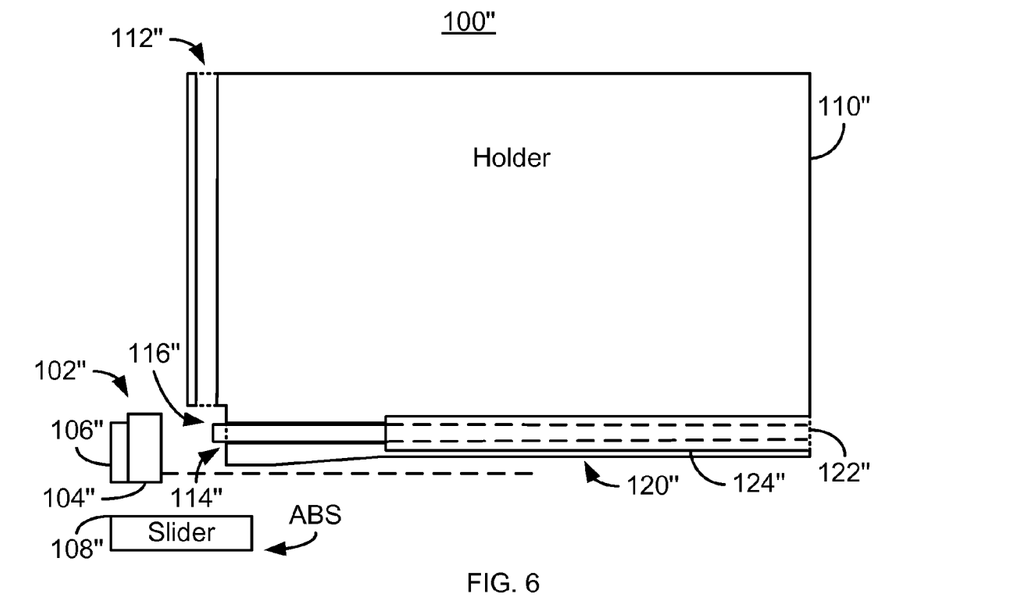
FIG. 6 is a diagram depicting another exemplary embodiment of an apparatus for attaching a laser diode to a slider.

FIG. 6 is a diagram depicting another exemplary embodiment of an apparatus 100" for attaching a laser diode to a slider. For clarity, FIG. 6 is not to scale. The apparatus 100" is analogous to the apparatus 100 and 100'. Thus, the apparatus 100" includes components having analogous structure and function to the components of the apparatus 100. The apparatus 100" is also depicted with a submount assembly 102" and slider 108" analogous to the submount assembly 102/102' and slider 108/108', respectively. The submount assembly 102" thus includes a submount 104" and a laser 106" analogous to the submount 104/104' and laser 106/106'. The apparatus 100" includes a holder 110" and an optical fiber 120" analogous to the holder 100/100' and optical fiber 120/120', respectively. For simplicity, only a portion of the holder 100" and optical fiber 120" are shown. The optical fiber 120" includes a core 122" and a sleeve 124" analogous to the core 122/122' and sleeve 124/124', respectively. The holder 110" includes a vacuum channel 112", an optical fiber aperture 114", notch 116" and a slider facing surface 118" analogous to the vacuum channel 112/112', the optical fiber apertures 114/114', notch 116 and the slider facing surface 118/118', respectively.

In the embodiment shown in FIG. 6, the optical fiber aperture 114" makes a different angle with the normal to the surface of the submount 104". More specifically, the optical fiber aperture 114" is substantially parallel to the normal to the surface of the submount 104" shown. However, other angles may be used.

The apparatus 100" may share the benefits of the apparatus 100 and/or 100'. More specifically, the apparatus 100" may be used to bond the slider 108" with the submount assembly 102". A solder or other bond between the submount assembly 102" and the slider having improved strength may be provided without damaging portions of the slider 108" near the ABS. Thus, yield for fabricating the EAMR head may be improved.

Figure 7:
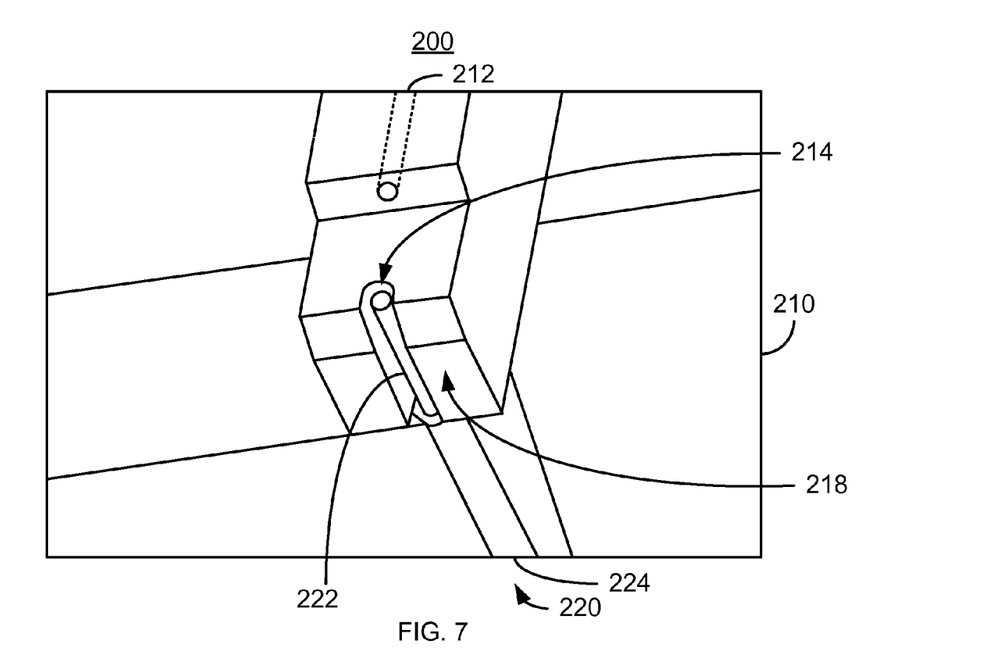
FIGS. 7-8 are diagrams depicting another exemplary embodiment of an apparatus for attaching a laser diode to a slider.
Figure 8:
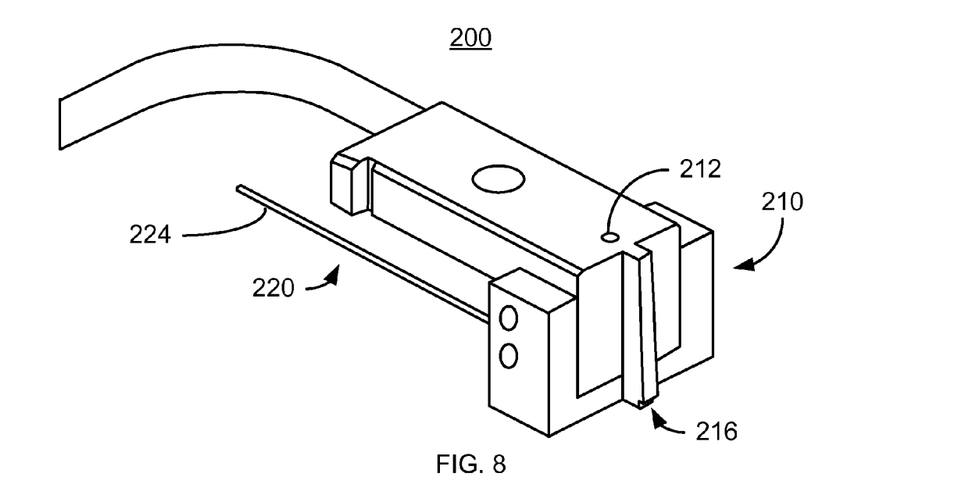

FIGS. 7-8 are diagrams depicting another exemplary embodiment of an apparatus 200 for attaching a laser diode to a slider. For clarity, FIGS. 7-8 are not to scale. The apparatus 200 is analogous to the apparatus 100, 100' and 100". Thus, the apparatus 200 includes components having analogous structure and function to the components of the apparatus 100, 100' and 100". The apparatus 200 is also depicted without a submount assembly. The apparatus 200 includes a holder 210 and an optical fiber 220 analogous to the holder 100/100'/100" and optical fiber 120/120'/120', respectively. For simplicity, only a portion of the holder 210 and optical fiber 220 are shown. The optical fiber 220 includes a core 222 and a sleeve 224 analogous to the core 122/122'/122" and sleeve 124/124'/124", respectively. The holder 210 includes a vacuum channel 212, an optical fiber aperture 214, notch 216 and a slider facing surface 218 analogous to the vacuum channel 112/112'/112", the optical fiber apertures 114/114'/114", notch 116/116" and the slider facing surface 118/118'/118", respectively.

In the embodiment shown in FIGS. 6-7, the optical fiber aperture 214 is not an enclosed aperture. Instead, the optical fiber aperture 214 is a groove formed in the holder 210. For example, a portion of the optical fiber aperture 214 is formed from a groove in the slider facing surface 218.

The apparatus 200 may share the benefits of the apparatus 100, 100' and/or 100". More specifically, the apparatus 200 may be used to bond a slider with a submount assembly. A solder or other bond between the submount assembly and the slider having improved strength may be provided without damaging portions of the slider near the ABS. Thus, yield for fabricating the EAMR head may be improved.

Figure 9:
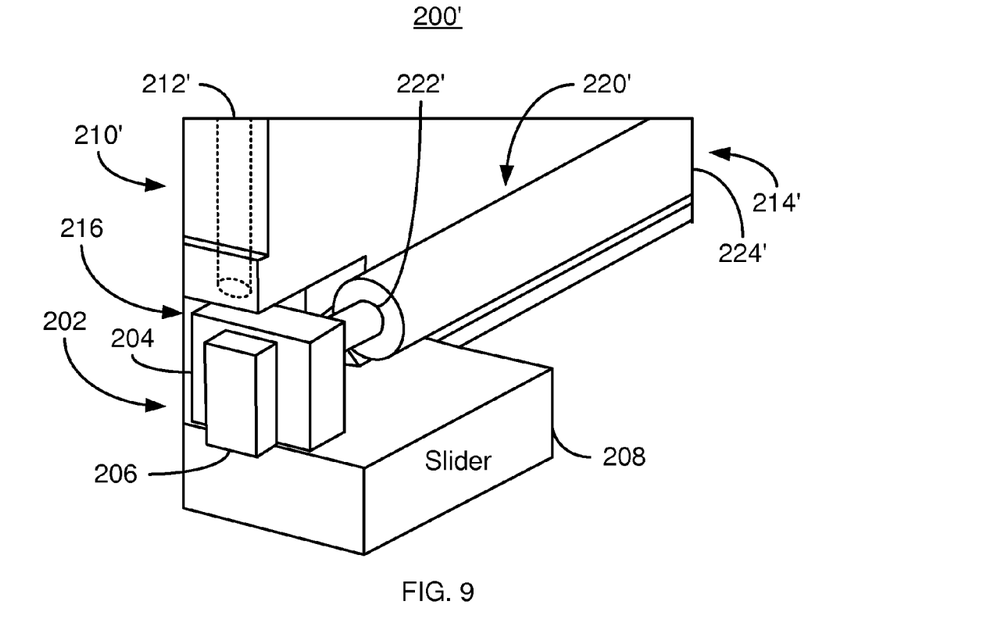
FIG. 9 is a diagram depicting another exemplary embodiment of an apparatus for attaching a laser diode to a slider.

FIG. 9 is a diagram depicting another exemplary embodiment of an apparatus 200' for attaching a laser diode to a slider. For clarity, FIG. 9 is not to scale. The apparatus 200' is analogous to the apparatus 100, 100', 100" and 200. Thus, the apparatus 200' includes components having analogous structure and function to the components of the apparatus 100, 100', 100" and 200. The apparatus 200' is also depicted with a submount assembly 202 and slider 208 analogous to the submount assembly 102/102'/102" and slider 108/108'/108", respectively. The submount assembly 202 thus includes a submount 204 and a laser 206 analogous to the submount 104/104'/104" and laser 106/106'/106". The apparatus 200' includes a holder 210' and an optical fiber 220' analogous to the holder 100/100'/100"/200 and optical fiber 120/120'/120'/220, respectively. For simplicity, only a portion of the holder 210' and optical fiber 220' are shown. The optical fiber 220' includes a core 222' and a sleeve 224' analogous to the core 122/122'/122"/222 and sleeve 124/124'/124"/224, respectively. The holder 210' includes a vacuum channel 212', an optical fiber aperture 214', notch 216' and a slider facing surface (not labeled) analogous to the vacuum channel 112/112'/112"/212, the optical fiber apertures 114/114'/114"/214, notch 116/116"/216 and the slider facing surface 118/118'/118"/218, respectively.

In the embodiment shown in FIG. 9, the optical fiber aperture 214' is not an enclosed aperture. Instead, the optical fiber aperture 214' is a groove formed in the holder 210'. However, in the embodiment shown, the groove is at the side of the holder 210'. Thus, the slide-facing surface may not have the groove for the optical fiber aperture 214' therein.

The apparatus 200' may share the benefits of the apparatus 100, 100', 100" and/or 200. More specifically, the apparatus 200' may be used to bond the slider 208 with the submount assembly 202. A solder or other bond between the submount assembly 202 and the slider having improved strength may be provided without damaging portions of the slider 208 near the ABS. Thus, yield for fabricating the EAMR head may be improved.

Figure 10:
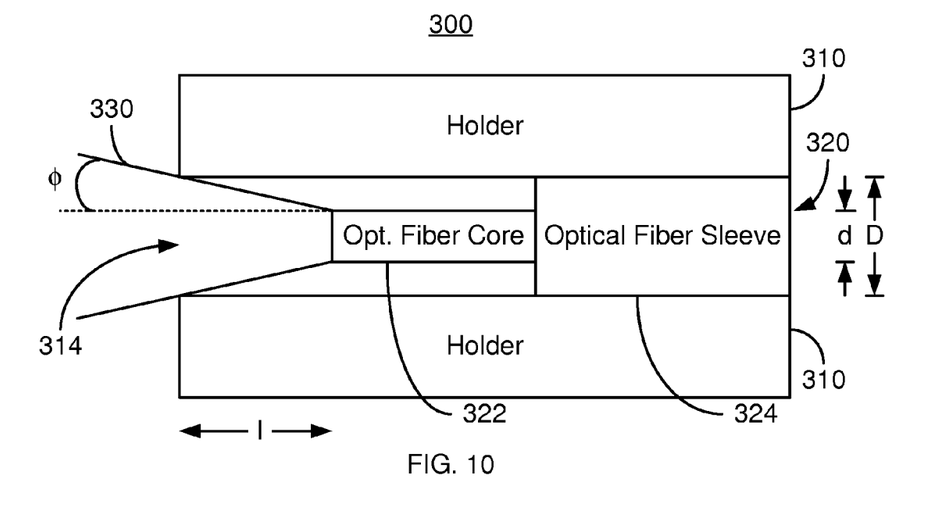
FIG. 10 is a diagram depicting another exemplary embodiment of an apparatus for attaching a laser diode to a slider indicating the spread of the laser beam.

FIG. 10 is a diagram depicting another exemplary embodiment of an apparatus 300 for attaching a laser diode to a slider. For clarity, FIG. 10 is not to scale. The apparatus 300 is analogous to the apparatus 100, 100', 100", 200 and 200'. Thus, the apparatus 200' includes components having analogous structure and function to the components of the apparatus 100, 100', 100", 200 and 200'. The apparatus 300 includes a holder 310 and an optical fiber 320 analogous to the holder 100/100'/100"/200/200' and optical fiber 120/120'/120'/220/220', respectively. For simplicity, only a portion of the holder 310 and optical fiber 320 are shown. The optical fiber 320 includes a core 322 and a sleeve 324 analogous to the core 122/122'/122"/222/222' and sleeve 124/124'/124"/224/224', respectively. The holder 210" includes a vacuum channel (not shown), an optical fiber aperture 314, notch (not shown) and a slider facing surface (not shown) analogous to the vacuum channel 112/112'/112"/212/212', the optical fiber apertures 114/114'/114"/214'214', notch 116/116"/216/216' and the slider facing surface 118/118'/118"/218/218', respectively.

In the embodiment shown in FIG. 10, the optical fiber 320 terminates within the optical fiber aperture. In the embodiment shown in FIG. 10, the optical fiber 320 is shown as carrying a laser pulse 330. The beam for the laser pulse 330 diverges at an angle of φ. As is also shown in FIG. 10, the laser pulse 330 is desired not to intersect the holder 310. In some embodiments, therefore, the length, l, from the end of the optical fiber aperture 314 may thus be restricted as follows. In the embodiment shown, the optical fiber core 322 has a diameter d, while the optical fiber aperture has a diameter D. In such embodiments, the length, l, may be given by:

$$l \leq (D-d)/(2*\tan \phi)$$

Stated differently, the length from the end of the optical fiber core 322 to the end of the optical fiber aperture 314 is not more than twice the difference in diameters of the optical fiber aperture 314 and the optical fiber core 322 divided by twice the tangent of the angle φ.

The apparatus 300 may share the benefits of the apparatus 100, 100', 100", 200 and/or 200'. Note also that one or more of the features of the apparatus 100, 100', 100", 200 and/or 200' may be combined. In addition, the holder 310 may not be heated by the laser pulse 330 because of the position of the optical fiber 320 within the optical fiber aperture. Thus, performance of the apparatus 300 may be improved.

Figure 11:
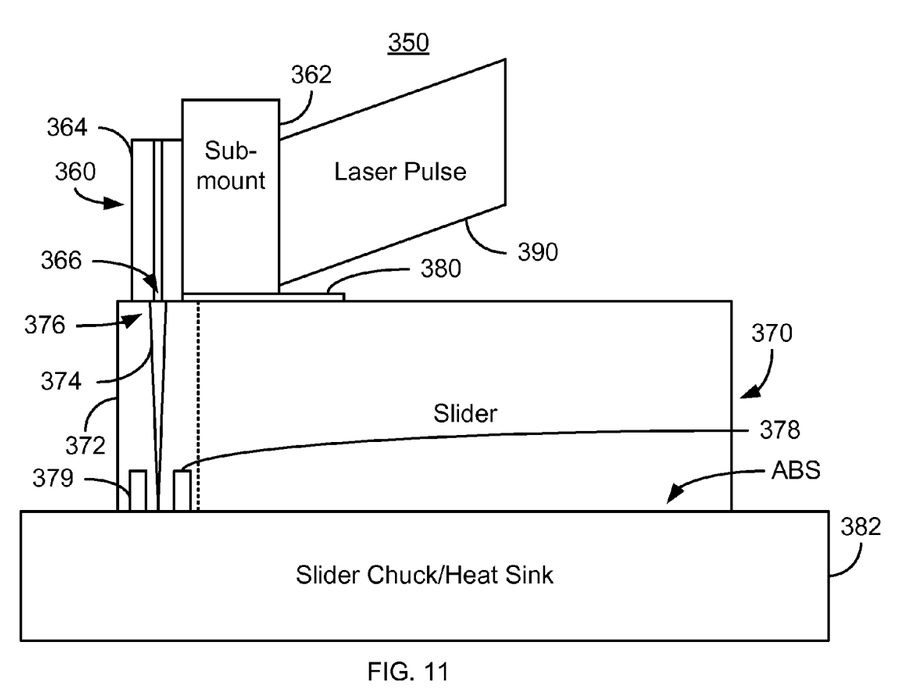
FIG. 11 is a diagram depicting an exemplary embodiment of the EAMR head during fabrication using an exemplary embodiment of the apparatus.

FIG. 11 is a diagram depicting an exemplary embodiment of the EAMR head 350 during fabrication using an exemplary embodiment of the apparatus. For clarity, FIG. 11 is not to scale. In particular, the EAMR head 350 is shown during solder bonding using an embodiment of the apparatus described herein. A submount assembly 360, slider 370, and slider chuck/heat sink 382 are shown. The submount assembly 360 includes a submount 362 and a laser 364 having a laser light emitting edge 366. The slider 370 includes a transducer 372 having a waveguide 374 used in writing to the media (not shown) and a read sensor 378 at the ABS. The waveguide 374 has an entrance 376. In addition, the slider 370 is also shown as having a temperature sensor 379. In some embodiments, the temperature sensor 379 is a thermal couple. In other embodiments, the read sensor 378 may be used to sense temperature. In still other embodiments, the temperature sensor 379 may be omitted. Also shown is solder pad 380.

During bonding, the slider 370 may be held in the slider chuck 382. In addition to holding the slider 370 in place, the slider chuck 382 may be used as a heat sink. Thus, the read sensor 378 may be even less likely to be damaged during solder bonding.

Because solder bonding is taking place, the laser pulse 390 is shown. The laser (not shown) may be pulsed for solder bonding to limit the temperature increase at the ABS of the slider 370. In the embodiment shown, the apparatus 100, 100', 100", 200, 200' and/or 300 has been configured such that the laser pulse 390 intersects a portion of the submount 362. However, the slider 370 is not intersected by the laser pulse. In some embodiments, the laser pulse 390 might intersect some or all of the solder pad 380.

The EAMR head 350 may enjoy the benefits provided by the apparatus 100, 100', 100", 200 and/or 200'. More specifically, the solder pad 380 may be reflowed to provide a solder bond having improved strength. This may be accomplished without damaging portions of the slider 370 near the ABS. Thus, yield for fabricating the EAMR head 350 may be improved.

Figure 12:
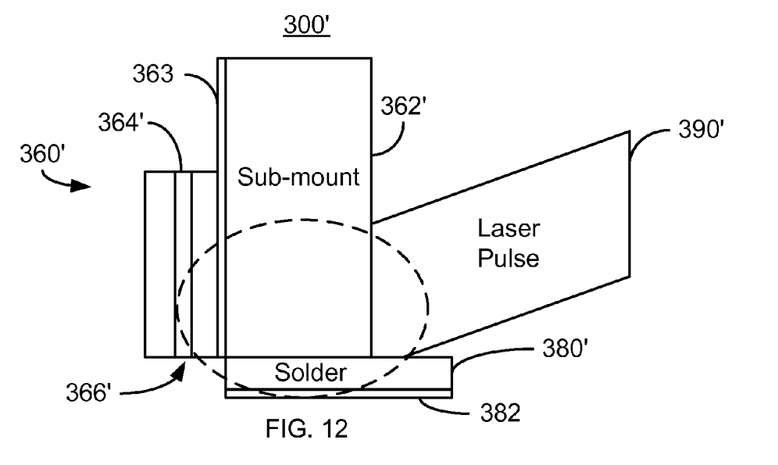
FIG. 12 is a diagram depicting another exemplary embodiment of the EAMR head during fabrication using an exemplary embodiment of the apparatus.

FIG. 12 is a diagram depicting another exemplary embodiment of the EAMR head 350' during fabrication using an exemplary embodiment of the apparatus. For clarity, FIG. 12 is not to scale. The EAMR head 350' is analogous to the EAMR head 350 and thus includes analogous components. The EAMR head 250' thus includes a submount assembly 360', a slider (not shown), and solder pad 380' that are analogous to the submount assembly 360, slider 370, and solder pad 380. The submount assembly 360' includes a submount 362' and a laser 364' having a laser light emitting edge 366'. Also shown is layer pulse 390' used to reflow the solder pad 380'.

Because solder bonding is taking place, the laser pulse 390' is shown. The laser (not shown) may be pulsed for solder bonding to limit the temperature increase at the ABS of the slider 370'. In the embodiment shown, the apparatus 100, 100', 100", 200, 200' and/or 300 has been configured such that the laser pulse 390' intersects a portion of the submount 362' as well as the solder pad 380'. However, the slider (not shown) is not intersected by the laser pulse. In addition, the submount 362' includes a reflective surface 363. In addition, the solder pad 380' includes a bottom reflector 382. The reflective surfaces 363 and 382 may ensure that the laser pulse 390' does not penetrate to the slider (not shown) or laser 364'. In other embodiments, the laser pulse 390' might not intersect the solder pad 380'. The dashed oval represents the region heated by the laser pulse 390'. Because the region heated by the laser pulse includes part of the solder pad 380', the solder 380' may reflow.

The EAMR head 350' may enjoy the benefits provided by the apparatus 100, 100', 100", 200 and/or 200'. More specifically, the solder pad 380' may be reflowed to provide a solder bond having improved strength. This may be accomplished without damaging portions of the near the ABS. Thus, yield for fabricating the EAMR head 350' may be improved.

Figure 13:
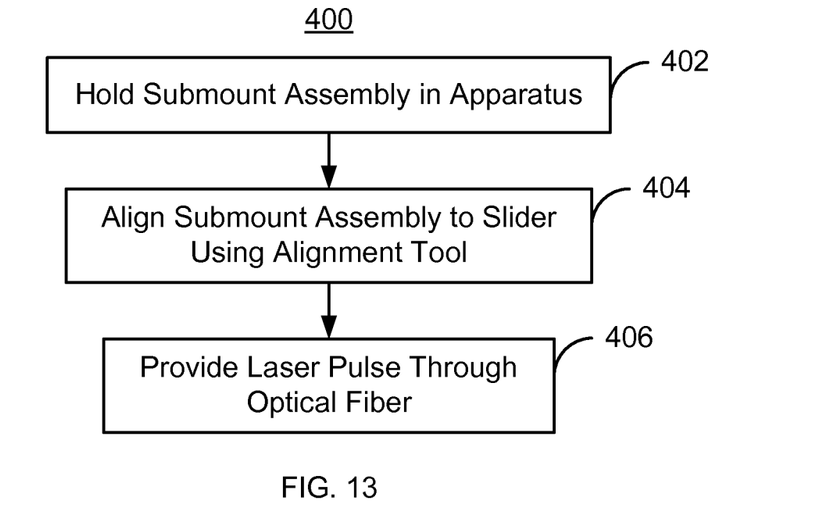
FIG. 13 is a flow chart depicting an exemplary embodiment of a method for attaching a laser diode to a slider in an EAMR head.

FIG. 13 is a flow chart depicting an exemplary embodiment of a method 400 for attaching a laser diode to a slider in an EAMR head. The method 400 uses an embodiment of the apparatus such as the apparatus 100, 100', 100", 200, 200', and/or 300. For simplicity, the method 400 is described in the context of the apparatus 100, the submount 102 and the slider 108.

The submount assembly 102 is held in the apparatus using a pressure differential developed in the vacuum channel 112, via step 402. More specifically, the pressure differential in the vacuum channel 112 may be used to pick up and hold the submount 104. The submount assembly 102 is aligned as desired to the slider 108, via step 404. Step 404 may include placing the slider-facing surface 118 in proximity to the slider 108 to make final adjustments. The submount assembly 102 may then be moved across the surface of the slider 118 to align the components. In some embodiments, alignment marks are used. In addition to passive alignment, active alignment (using feedback form the laser) may be used. A laser pulse is provided through the optical fiber 120 via step 406. Step 406 may include ensuring that the laser pulse intersects only the submount 104. In other embodiments, the laser pulse may intersect a portion of the solder. The laser pulse melts solder between the submount assembly 102 and the slider 108. In addition, step 406 may include coupling the laser pulse to the submount 104 via free space. Finally, step 406 includes ensuring that the desired portion of the slider at the ABS is not heated above 200° C. Thus, the apparatus may be used to solder bond the slider 108 to the submount assembly 102 using a higher temperature solder and providing a stronger solder bond without damaging portions of the slider 108 such as the read sensor. Thus, yield of the method 400 and performance of the EAMR head may be enhanced.

We claim:

1. An apparatus for attaching a submount assembly to a slider, the submount assembly including a submount and a laser diode on the submount, the submount including a first surface, the slider including an air-bearing surface (ABS) and a transducer, the apparatus comprising:

an optical fiber configured to carry a laser pulse; and
a holder including a vacuum channel therein, an optical fiber aperture therein, and a second surface having an aperture for the vacuum channel therein, a portion of the optical fiber being held in the optical fiber aperture, the vacuum channel being configured to hold the first surface of the submount against the second surface of the holder by a pressure differential between a pressure developed in the vacuum channel and an external pressure at a remaining portion of the submount assembly, the pressure in the vacuum channel being less than the external pressure, the laser diode being attached to a third surface of the submount different from the first surface, the submount including a fourth surface adjoining and at a first angle from the first surface, the holder further including a notch therein, the notch including the second surface of the holder and a fifth surface at a second angle from the second surface, the notch being configured such that the vacuum channel holds the first surface of the submount against the second surface of the notch and holds the fourth surface of the submount against the fifth surface of the notch, the third surface of the submount being opposite to the fourth surface of the submount.

2. The apparatus of claim 1 wherein the optical fiber terminates between the optical fiber aperture and the submount assembly.

3. The apparatus of claim 1 wherein the optical fiber terminates within the optical fiber aperture.

4. The apparatus of claim 1 wherein the vacuum channel terminates at the second surface and the optical fiber aperture terminates at the fifth surface, the second surface and the fifth surface being substantially perpendicular.

5. The apparatus of claim 4 wherein the holder further includes a slider-facing surface configured to reside adjacent to the slider.

6. The apparatus of claim 3 wherein the holder is configured such that the laser pulse does not intersect any portion of the holder.

7. The apparatus of claim 6 wherein the laser pulse diverges at an angle from the optical fiber, the optical fiber aperture has a first diameter, the optical fiber has a second diameter, the first diameter minus the second diameter being a quantity, and wherein the optical fiber terminates a length from an end of the optical fiber aperture that is not more than the quantity divided by twice a tangent of the angle.

8. The apparatus of claim 3 wherein the optical fiber terminates a length from the submount and wherein the length is at least twenty-five microns and not more than three hundred microns.

9. The apparatus of claim 3 wherein the laser pulse is coupled from the optical fiber to the submount assembly via free space.

10. The apparatus of claim 3 wherein the holder is configured such that the laser pulse intersects at least a portion of the submount.

11. The apparatus of claim 10 wherein a portion of the transducer resides at the ABS, the holder is configured such that the portion of the transducer is not heated above two hundred degrees centigrade by the laser pulse.

12. The apparatus of claim 10 wherein the holder is configured such that the laser pulse does not intersect the slider.

13. The apparatus of claim 10 wherein the submount assembly is bonded to the slider using a solder pad and wherein the holder is configured such that the laser pulse intersects at least a portion of the solder pad.

14. The apparatus of claim 3 wherein the holder includes a surface having a depression therein, the optical fiber aperture being formed by the depression.

15. The apparatus of claim 3 wherein the optical fiber is configured to reside at an angle of at least five degrees and not more than forty-five degrees from a normal to an optical fiber-facing surface of the submount when the submount is held by the vacuum channel.

16. An apparatus for attaching a submount assembly to a slider, the submount assembly including a submount and a laser diode on the submount, the slider including an air-bearing surface (ABS) and a transducer, the submount including a first submount surface, a second submount surface adjoining and at a nonzero angle with the first submount surface and a third submount surface opposite to the second submount surface, the apparatus comprising:
 an optical fiber configured to carry a laser pulse; and
 a holder including a notch therein, the notch having a first surface and a second surface, a vacuum channel therein and an optical fiber aperture therein, the first surface of the notch including a vacuum channel aperture therein, the second surface of the notch having the optical fiber aperture, a portion of the optical fiber being held in the optical fiber aperture such that the optical fiber terminates within the optical fiber aperture, the vacuum channel being configured to hold the first submount surface against the first surface of the notch and to hold the second submount surface against the second surface of the notch by a pressure differential between a pressure developed in the vacuum channel and an external pressure at a remaining portion of the submount assembly, the pressure in the vacuum channel being less than the external pressure, the vacuum channel terminating at the first surface of the notch, the optical fiber aperture terminating at the second surface of the notch, first surface being substantially perpendicular to the second surface, the holder being configured such that the laser pulse intersects at least a portion of the submount without intersecting any portion of the slider, the optical fiber terminating not more than three hundred microns from the submount, the laser diode being on the third submount surface.

17. A method for attaching a submount assembly to a slider, the submount assembly including a submount and a laser diode on the submount, the slider including an air-bearing surface and a transducer, the submount including a first surface, the method comprising:
 holding the submount assembly in a pickup tool using a pressure differential, the pickup tool having a holder and an optical fiber, a holder including a vacuum channel therein, an optical fiber aperture therein, and a second surface having an aperture for the vacuum channel therein, a portion of the optical fiber being held in the optical fiber aperture, the submount assembly being held in the holder by the first surface of the submount being held against the second surface of the holder by a pressure differential between a pressure developed in the vacuum channel and an external pressure at a remaining portion of the submount assembly, the pressure in the vacuum channel being less than the external pressure, the laser diode being attached to a third surface of the submount different from the first surface, the submount including a fourth surface adjoining and at a first angle from the first surface, the holder further including a notch therein, the notch including the second surface of the holder and a fifth surface at a second angle from the second surface, the notch being configured such that the vacuum channel holds the first surface of the submount against the second surface of the notch and holds the fourth surface of the submount against the fifth surface of the notch, the third surface of the submount being opposite to the fourth surface of the submount;
 aligning the submount assembly to the slider; and
 providing a laser pulse through the optical fiber.

18. The method of claim 17 wherein the laser pulse for melting solder residing between the submount assembly and the slider.

19. The method of claim 17 wherein the optical fiber terminates between the optical fiber aperture and the submount assembly.

20. The method of claim 17 wherein the optical fiber terminates within the optical fiber aperture.

21. The method of claim 20 wherein the vacuum channel terminates in the surface and the optical fiber aperture terminates at the fifth surface, the second surface being substantially perpendicular to the fifth surface.

22. The method of claim 21 wherein the holder further includes a slider-facing surface and wherein the step of aligning further includes:
 placing slider-facing surface adjacent to the slider.

23. The method of claim 20 wherein the holder is configured such that the laser pulse does not intersect any portion of the holder.

24. The method of claim 20 wherein the laser pulse diverges at an angle from the optical fiber, the optical fiber aperture has a first diameter, the optical fiber has a second diameter, the first diameter minus the second diameter being a quantity, and wherein the optical fiber terminates a length from an end of the optical fiber aperture that is not more than the quantity divided by twice a tangent of the angle.

25. The method of claim 24 wherein the optical fiber terminates a length from the submount and wherein the length is at twenty-five microns and not more than three hundred microns.

26. The method of claim 20 wherein the step of providing the laser pulse further includes:
 coupling the laser pulse from the optical fiber to the submount assembly via free space.

27. The method of claim 20 wherein the step of providing the laser pulse further includes:
 aligning the optical fiber with the submount assembly such that the laser pulse intersects at least a portion of the submount.

28. The method of claim 27 wherein a portion of the transducer resides at the ABS and wherein the step of providing the laser pulse further includes:
 heating the submount assembly such that the portion of the transducer is not heated above two hundred degrees centigrade by the laser pulse.

29. The method of claim 27 wherein the step of providing the laser pulse further includes:
 aligning the optical fiber with the submount assembly such that the laser pulse does not intersect the slider.

30. The method of claim 26 wherein the submount assembly is bonded to the slider using a solder pad and wherein the step of providing the laser pulse further includes:
 aligning the optical fiber with the submount assembly such that the laser pulse intersects at least a portion of the solder pad.

31. The apparatus of claim 1 wherein the first surface has a surface area, wherein the aperture of the vacuum channel has an area, the vacuum channel being configured to hold the submount assembly at the aperture on the second surface, the area of the aperture being smaller than the surface area of the first surface and being configured to reside entirely on the surface area of the first surface such that the pressure differential is between a portion of the first surface covered by the exit and the remaining portion of the submount assembly.

32. The apparatus of claim 16 wherein the first submount surface has a surface area, wherein the vacuum channel aperture has an area, the vacuum channel being configured to hold the submount assembly at the vacuum channel aperture on the first surface, the area of the vacuum channel aperture being smaller than the surface area of the first submount surface and being configured to reside entirely on the surface area of the first submount surface such that the pressure differential is between a portion of the first submount surface covered by the exit and the remaining portion of the submount assembly.

* * * * *